(12) United States Patent
Jonnalagadda et al.

(10) Patent No.: US 11,021,802 B2
(45) Date of Patent: Jun. 1, 2021

(54) METHODS OF FORMING A STRENGTHENED COMPONENT

(71) Applicant: Unison Industries, LLC, Jacksonville, FL (US)

(72) Inventors: Dattu G V Jonnalagadda, Ponnur (IN); Sebastian Merin, Bangalore (IN); Balaraju Suresh, Bangalore (IN); Daniel Dyer, Dayton, OH (US); Gordon Tajiri, Allentown, PA (US); Yanzhe Yang, Mason, OH (US)

(73) Assignee: Unison Industries, LLC, Jacksonville, FL (US)

( * ) Notice: Subject to any disclaimer, the term of this patent is extended or adjusted under 35 U.S.C. 154(b) by 6 days.

(21) Appl. No.: 15/581,627

(22) Filed: Apr. 28, 2017

(65) Prior Publication Data

US 2018/0312987 A1 Nov. 1, 2018

(51) Int. Cl.
*C25D 1/02* (2006.01)
*F02C 9/18* (2006.01)
*F01D 9/06* (2006.01)

(52) U.S. Cl.
CPC ............... *C25D 1/02* (2013.01); *F01D 9/06* (2013.01); *F02C 9/18* (2013.01); *F05D 2220/323* (2013.01); *F05D 2230/30* (2013.01)

(58) Field of Classification Search
CPC ..... C25C 1/02; F02C 9/18; F01D 9/06; F05D 2230/30; F05D 2230/323
See application file for complete search history.

(56) References Cited

U.S. PATENT DOCUMENTS

| | | | |
|---|---|---|---|
| 2,181,256 A | * | 11/1939 | Arbogast ............... C25D 1/02 204/281 |
| 6,027,631 A | | 2/2000 | Broadbent |
| 2001/0015043 A1 | | 8/2001 | Brenneis et al. |
| 2007/0251825 A1 | | 11/2007 | Kenney |
| 2014/0202170 A1 | | 7/2014 | Cook, III |
| 2015/0063903 A1 | | 3/2015 | Matthews et al. |

(Continued)

FOREIGN PATENT DOCUMENTS

| | | |
|---|---|---|
| DE | 29 47 247 A1 | 5/1981 |
| DE | 2947247 A1 * | 5/1981 ............... C25D 1/02 |
| EP | 2 182 096 A1 | 5/2010 |

(Continued)

OTHER PUBLICATIONS

Extended European Search Report and Opinion issued in connection with corresponding EP Application No. 18169466.2 dated Sep. 18, 2018.

(Continued)

*Primary Examiner* — Louis J Rufo
(74) *Attorney, Agent, or Firm* — McGarry Bair PC

(57) ABSTRACT

A method of forming a strengthened component includes forming a sacrificial material into a mold of the component having an outer surface, disposing an insert having an inner surface and an outer surface opposite and spaced from the inner surface such that the strengthening insert inner surface abuts the mold outer surface, forming the component by way of electrodisposition of a metallic layer over the exposed mold outer surface and the exposed strengthening insert outer surface, and removing the sacrificial material from the component.

16 Claims, 8 Drawing Sheets

(56) References Cited

U.S. PATENT DOCUMENTS

2016/0017509 A1* 1/2016 Agustoni ............... C25D 1/003
368/276

FOREIGN PATENT DOCUMENTS

| GB | 1213821 | A | | 11/1970 | | |
|----|---------|---|---|---------|---|---|
| GB | 2094350 | A | * | 9/1982 | ............... | C25D 5/00 |
| JP | S52-57038 | A | | 5/1977 | | |
| JP | H02135795 | U | | 11/1990 | | |
| WO | 2015042089 | A1 | | 3/2015 | | |

OTHER PUBLICATIONS

Chinese Patent Office, Office Action re Chinese Patent Application No. 201810392231.X, dated Sep. 24, 2019, 7 pages, China.

* cited by examiner

METHODS OF FORMING A STRENGTHENED COMPONENT

BACKGROUND OF THE INVENTION

Contemporary engines used in aircraft can include fluid passageways for providing flow from a fluid source to a fluid destination. In one non-limiting example, a bleed air system can receive pressurized bleed air from a compressor section of an engine and convey to a fluidly downstream component or system, such as an environmental control system. Additional fluid passageways can be utilized for carrying, transferring, or otherwise flowing fluid including, but not limited to, oil, coolant, water, fuel, or the like. In the example of an aircraft engine, the passageways can be exposed to high pressures, high temperatures, stresses, vibrations, thermal cycling, and the like. The passageway, or other component formed in a similar process, can be configured, designed, or arranged to provide reliable operation in the functional environment.

BRIEF DESCRIPTION OF THE INVENTION

In one aspect, the disclosure relates to a method of forming a strengthened component, the method including providing a sacrificial material into a mold of the component having an outer surface, disposing a strengthening insert having an inner surface and an outer surface, opposite and spaced from the inner surface, such that the strengthening insert inner surface abuts the mold outer surface, forming the component by way of electrodisposition a metallic layer over the exposed mold outer surface and the exposed strengthening insert outer surface, and removing the sacrificial material to define the component.

In another aspect, the disclosure relates to a method of forming a fluid conduit for an aircraft bleed air system, the method including providing a sacrificial material into a mold of the fluid conduit having an outer surface, disposing a strengthening metallic insert relative to the mold at a high stress area pre-identified to experience higher stress during aircraft operations, compared with non-high-stress areas, the metallic insert having an inner surface and an outer surface opposite and spaced from the inner surface, the distance between the inner surface and the outer surface defining a first thickness, and wherein the strengthening insert inner surface abuts the mold outer surface, forming the fluid conduit by way of electroforming a metallic layer over the exposed mold outer surface and the exposed strengthening insert outer surface, the electroformed metallic layer having a second thickness, and removing the sacrificial material from the fluid conduit. The second thickness is less than the first thickness.

In yet another aspect, the disclosure relates to an electroformed component, including a base having a first outer surface, a metallic strengthening insert having an first inner surface and a second outer surface opposite and spaced from the first inner surface, the first inner surface abutting the first outer surface, and an electroformed metallic layer having a second inner surface and a third outer surface opposite and spaced from the second inner surface, the second inner surface abutting the second outer surface and at least a portion of the first outer surface.

DESCRIPTION OF EMBODIMENTS OF THE INVENTION

Figure 1:
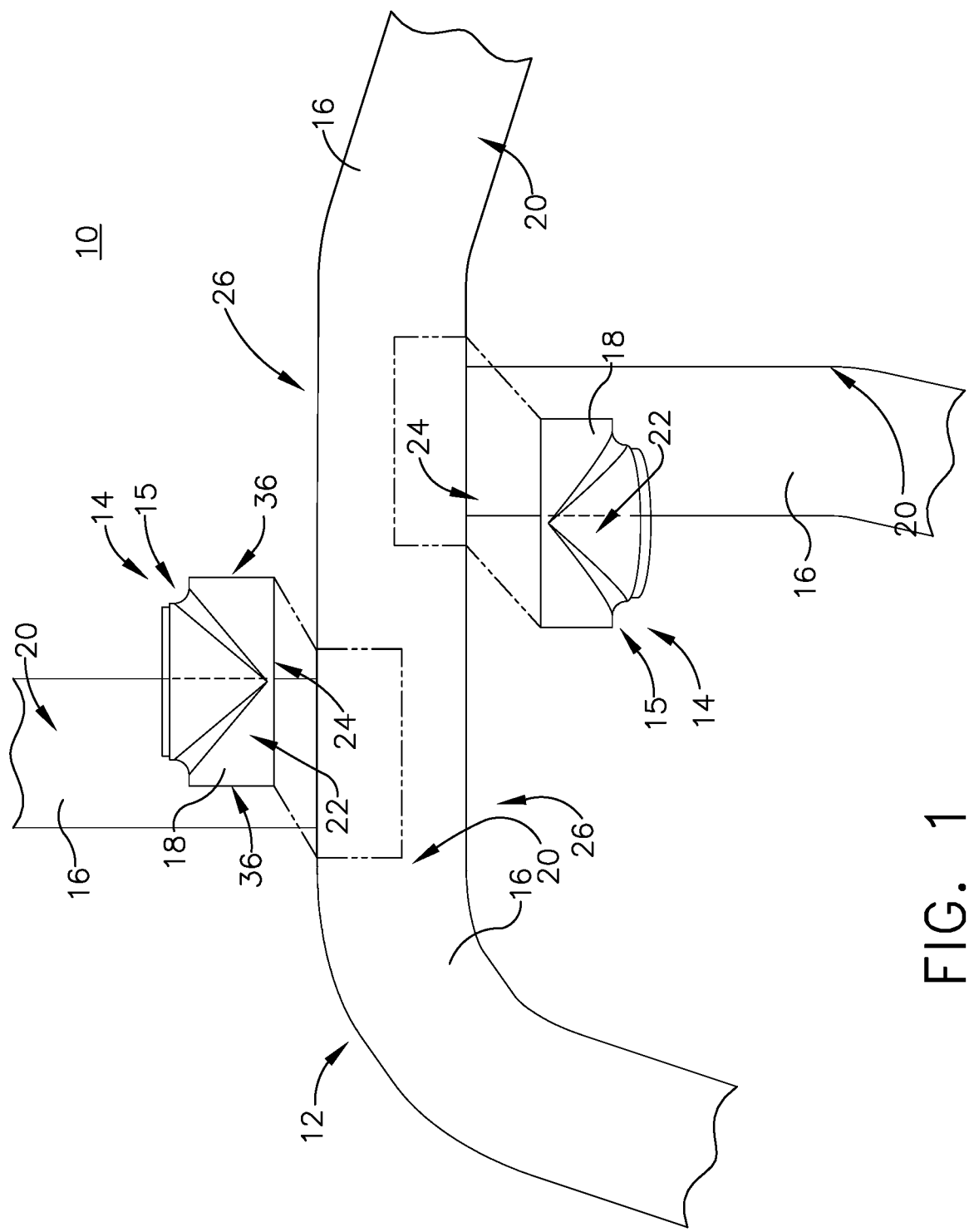
FIG. 1 is an exploded perspective view of a molding and a strengthening insert for a component of a partially-formed fluid conduit, in accordance with various aspects described herein.

In specialized environments or installations, components, walls, conduits, passageways, or the like can be configured, arranged, tailored or selected based on particular requirements. Non-limiting aspects for particular requirements can include geometric configuration, space or volume considerations, weight considerations, or operational environment considerations. Non-limiting aspects of operational environment considerations can further include temperature, altitude, pressure, vibrations, thermal cycling, or the like.

In one non-limiting example of a specialized application, a set of fluid conduits can be tailored for use in a bleed air system for an aircraft. The bleed air system can, for instance, supply or provide a passageway for airflow from an engine, a turbine, or from the environment external to the aircraft, to a downstream element. Non-limiting examples of the downstream element can utilize the airflow for heating, cooling, or pressurizing an element, system, or otherwise airflow-utilizing component. Bleed air system fluid conduits can further be exposed to operational environment considerations, such as those described herein.

While aspects of the disclosure are described with reference to enclosed fluid conduits for a bleed air system of an aircraft, aspects of the disclosure can be implemented in any component, walls, conduits, passageways, or the like, regardless of environment or installation location. It will be understood that the present disclosure can have general applicability in non-aircraft applications, such as other mobile applications and non-mobile industrial, commercial, and residential applications as well.

While "a set of" various elements will be described, it will be understood that "a set" can include any number of the respective elements, including only one element. The use of the terms "proximal" or "proximally," either by themselves or in conjunction with other terms or elements, refers to a component being relatively closer to a reference point or element compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "joint" can refer to any connection or coupling between proximate components, including, but not limited to, the connection of components in line with one another, or at a relative angle to one another. Also as used herein, "sacrificial" can refer to an element, component, or material composition that can be removed. Non-limiting examples of "sacrificial" elements can include a meltable composition such as wax or plastic, or a dissolvable composition. In this sense, the "sacrificial" element can be removed by way of melting when exposed to a heating element, or dissolved when exposed to a dissolving composition. Additional or alternative non-limiting aspects of sacrificial element removal can be included, such as mechanical disassembly, or physically removing elements or sub-elements. The exemplary drawings are for purposes of illustration only and the dimensions, positions, order and relative sizes reflected in the drawings attached hereto can vary.

FIG. 1 illustrates a perspective view of a partially-formed fluid conduit assembly 10. The partially-formed fluid conduit assembly 10 can include a set of discrete or continuous conduit molds 12 including a set or series of sacrificial or molded elements 16 arranged, configured, assembled, or the like, in a form or shape of a desired configuration, such as a portion of a bleed air system fluid conduit. The sacrificial elements 16 can include an outer surface 20. At least a subset of the sacrificial elements 16 can be molded to at least partially form a component 14, such as a wall, a housing, or a desired joining location between connected elements, such as a joint, illustrated as T-joints 15, or T-joint assemblies. As used herein, a "T-joint" denotes the "T" shaped configuration of adjoining arms, passages, conduits, or segments of the conduit molds 12 or partially-formed fluid conduit assembly 10.

Aspects of the partially-formed fluid conduit assembly 10, component 14, or T-joint 15 can also include a strengthening insert 18 having an inner surface 24, and an outer surface 22 opposite and spaced from the inner surface 24. Non-limiting aspects of the strengthening insert 18 can include a metallic composition, for example, to provide strength, rigidity, reliability, resilience, or the like. Non-limiting examples of strengthening insert 18 compositions can include, but are not limited to, nickel and nickel alloys, iron and iron alloys, aluminum, titanium, Inconel and Inconel alloys, of the like, or a combination thereof. In one non-limiting aspect, the increase in "strength" can be related to or associated with a corresponding increase in insert 18 material hardness. The strengthening insert 18 can be disposed, positioned, configured, or arranged relative to at least one of the sacrificial molded elements 16, the set of conduit molds 12, or the partially-formed fluid conduit assembly 10, component 14, or T-joint 15. In one non-limiting example, at least a portion of the inner surface 24 of the strengthening insert 18 can abut at least a portion of the outer surface 20 of the sacrificial element 16. The strengthening insert 18 can be contoured, shaped, keyed, configured, or the like, such that the entire inner surface 24 abuts the outer surface 20 of the sacrificial element 16. The strengthening insert 18 can include spaced or opposing insert ends 36. In the non-limiting examples, the insert ends 36 can include straight edges.

Aspects of the partially-formed fluid conduit assembly 10, component 14, or T-joint 15 can be included wherein the strengthening insert 18 can be disposed relative to, located, or arranged proximate to a pre-identified high stress area 26 of the partially-formed fluid conduit assembly 10, component 14, or T-joint 14.

The partially-formed fluid conduit assembly 10 of FIG. 1 can be covered, enveloped, or encased in a metallic layer by way of an electrodisposition process. As used herein, "electrodisposition" can include any process for building, forming, growing, or otherwise creating a metallic layer over another substrate or base. Non-limiting examples of electrodisposition can include electroforming, electroless forming, electroplating, or a combination thereof. While the remainder of the disclosure is directed to electroforming, any and all electrodisposition processes are equally applicable. In one non-limiting example of an electroforming process, the partially-formed fluid conduit assembly 10 of FIG. 1 can be submerged in an electrolytic liquid and electrically charged. The electric charge of the partially-formed fluid conduit assembly 10 can attract an oppositely charged electroforming material through the electrolytic solution. The attraction of the electroforming material to the partially-formed fluid conduit assembly 10 ultimately deposits the electroforming material on the exposed surfaces of the partially-formed fluid conduit assembly 10, creating an external metallic layer. Thus, the electroforming process can be utilized to form at least a portion of the component 14, the T-joint 15, the high stress area 26, of the partially-formed fluid conduit assembly 10 by way of a metallic layer over the exposed outer surface 20 of the set of sacrificial elements 16, the outer surface 22 of the strengthening element 18, or a combination thereof.

In one non-limiting example, electroforming material can include nickel and nickel alloys, iron and iron alloys, aluminum, titanium, Inconel and Inconel alloys, or the like, or a combination thereof. In another non-limiting example, at least a portion of the exposed surfaces 20, 22 of the partially-formed fluid conduit assembly 10 can include a metalized layer prior to the electroforming process.

Figure 2:
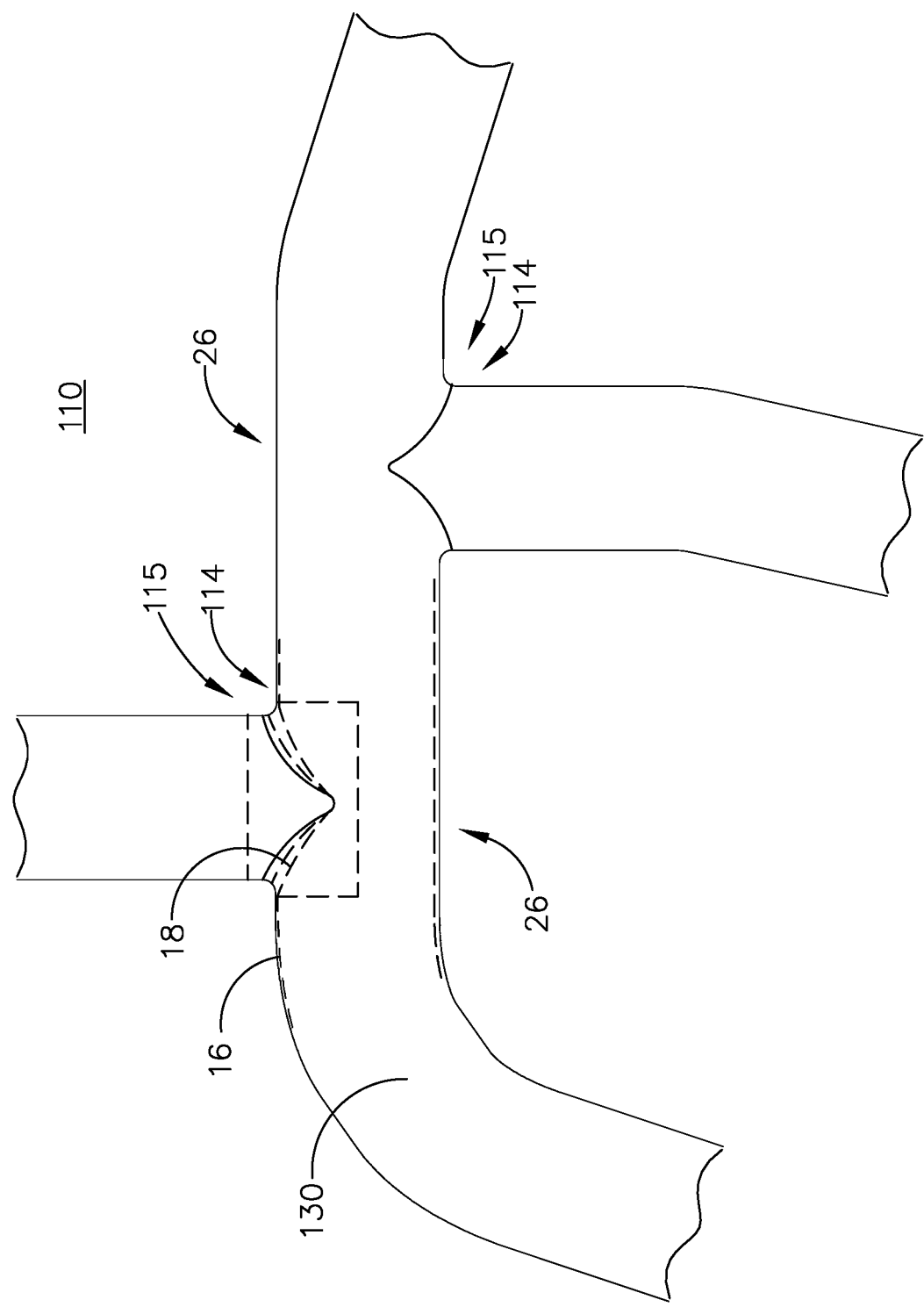
FIG. 2 is a perspective view of a strengthened component of the partially-formed fluid conduit of FIG. 1, with dotted schematic outline of the strengthening insert, in accordance with various aspects described herein.

FIG. 2 illustrates a partially-formed fluid conduit assembly 110, component 114, or T-joint 115 having an electroformed metallic layer 130 according to another aspect of the present disclosure. The partially-formed fluid conduit assembly 110 is similar to the partially-formed fluid conduit assembly 10; therefore, like parts will be identified with like numerals increased by 100, with it being understood that the description of the like parts of the partially-formed fluid conduit assembly 10 applies to the partially-formed fluid conduit assembly 110, unless otherwise noted. One difference is that the electroformed metallic layer 130 can include at least a portion of the "forming" of the partially-formed fluid conduit assembly 110. FIG. 2 further illustrates in dotted outline, aspects of the sacrificial element 16 and the strengthening insert 18, for ease of understanding. As shown, at least the strengthening insert 18 can be fixed relative to the partially-formed fluid conduit assembly 110, the high stress area 26, the component 114 or the T-joint 115 or electroformed metallic layer 130, by way of the electroforming process.

Figure 3:
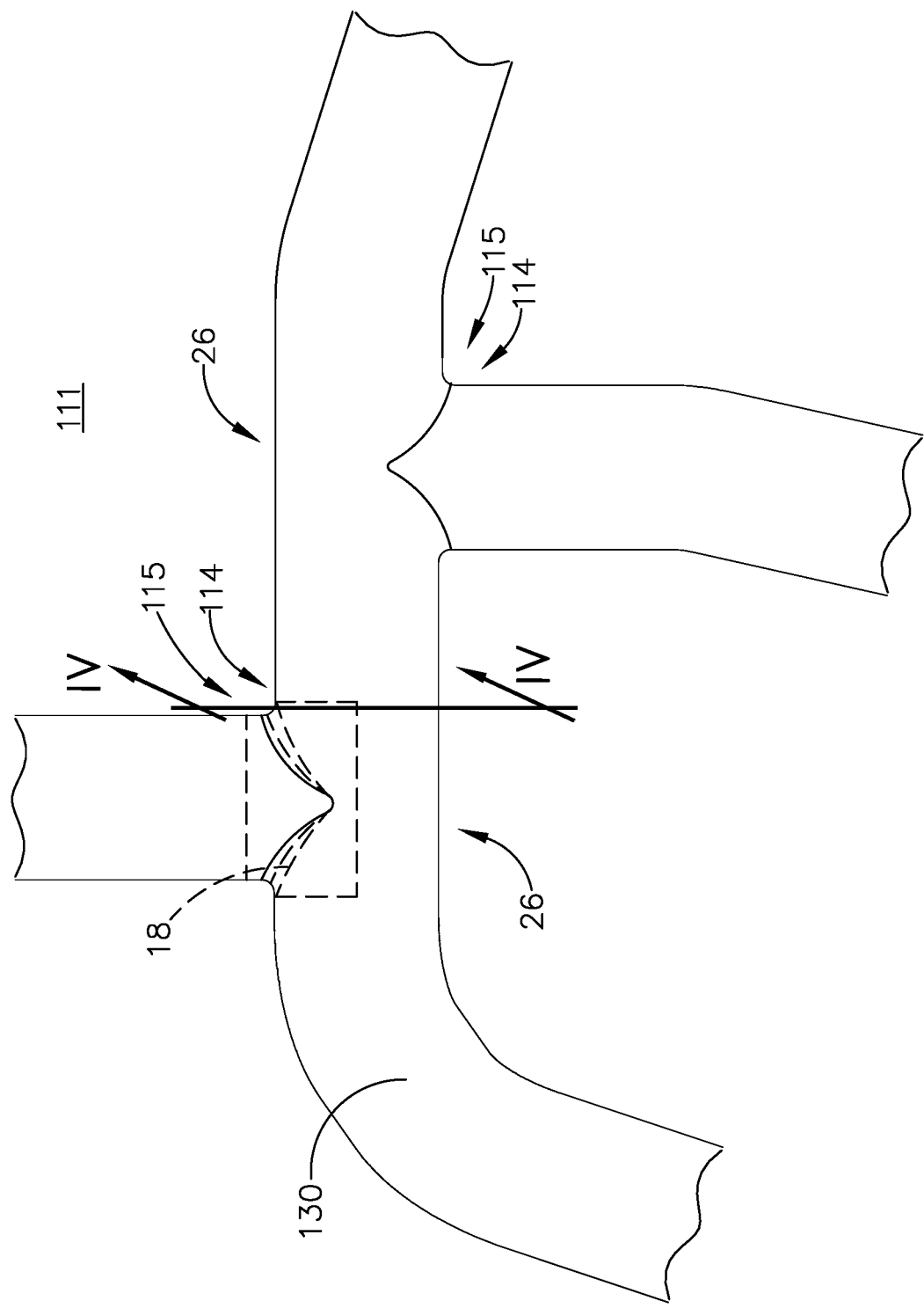
FIG. 3 is a perspective view of a strengthened component of a fully-formed fluid conduit, with dotted schematic outline of the strengthening insert, in accordance with various aspects described herein.

FIG. 3 illustrates a fully-formed fluid conduit assembly 111 (hereafter, "the fluid conduit assembly"), and dotted outline of the strengthening insert 18. After the forming of the fluid conduit assembly 111, as described herein, the set of sacrificial elements 16, can be "sacrificed" or removed, as described above. Thus, aspects of the fluid conduit assembly 111 can include only the strengthening insert 18 and the electroformed metallic layer 130.

Figure 4:
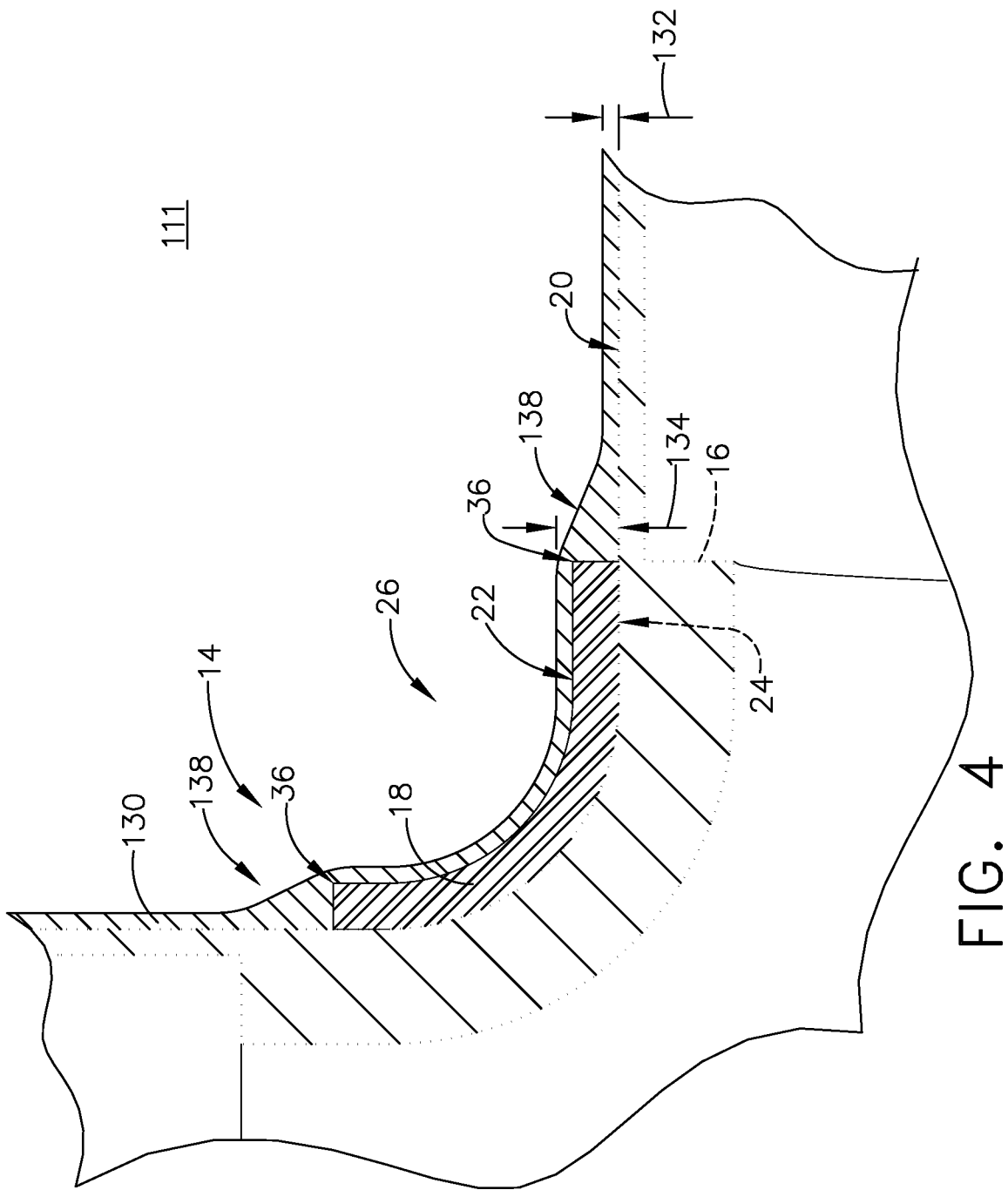
FIG. 4 is a schematic cross-sectional view of the strengthened component, taken along line IV-IV of FIG. 3, in accordance with various aspects described herein.

FIG. 4 illustrates a schematic cross section of the high stress area 26 of FIG. 3. As used herein, a "high stress area" 26 can refer to an area, an interface, a joint 14 between elements, or a portion of the partially-formed fluid conduit assembly 10 expected, designed, or intended to experience higher stress compared with non-high-stress portions of the partially-formed fluid conduit assembly 10. For instance, the high stress area 26 can be a result of the geometric configuration of the partially-formed fluid conduit assembly 10, or connections thereto. Non-limiting examples of stress can include vibration, torque, pressure, thermal cycling, or the like, and can be based at least partially on an operating environment of the partially-formed fluid conduit assembly 10. The stress can affect the high stress area 26, the joint 14, or the partially-formed fluid conduit assembly 10, resulting in, for example, component failure, fatigue, deformation, damage, or the like. The stress can affect the high stress area 26 instantaneously during fluid conduit assembly 10 operations, or over an elongated period of time. In this sense, a "high stress area" 26 can include a position or location that can to fail due to stresses experienced. Aspects of the disclosure can be included wherein the disposing of the strengthening insert 18 proximate or relative to the high stress area 26 can provide structural support or integrity to counter the stresses experienced at the high stress area 26. Stated another way, the strengthening insert 18 enables, provides for, or allows the fluid conduit assembly 10 or joint 14 to be better suited to resist failure at the high stress area 26 or at the joint 14.

As shown, the electroforming process can be selected, controlled, selected, or the like, to ensure at least a minimal electroformed material thickness 132 over each exposed surface 20, 22 of the partially-formed fluid conduit assembly 10. One non-limiting example minimal electroformed material thickness 132 is 0.40 millimeters. Also as shown, the electroformed material thickness 132 can be less than the strengthening insert thickness 134. In this sense, the primary structural support at the high stress area 26 can be provided by the strengthening insert 18, as opposed to the electroformed metallic layer 130, which the electroformed metallic layer 130 can provide the primary structural support for the non-high-stress areas. Thus, non-limiting aspects of the disclosure can be included wherein the electroforming material, or the electroformed material thickness 132 is selected based on desired operating aspects of the fluid conduit assembly 111, including but not limited to, pressure, fluid type, fluid temperature, the like, or a combination thereof. Likewise, non-limiting aspects of the disclosure can be included wherein the strengthening insert 18 or strengthening insert thickness 134 can be selected based on the same electroformed material considerations or the expected stresses described herein, or a combination thereof.

The use of the straight edge interface of the insert ends 36 can, in some instances, result in a higher current density during the electroforming process, producing a greater electroformed metallic layer thickness area 138 proximate to the insert ends 36. Thus, aspects of the disclosure can be included wherein the insert ends 36 can be configured, selected, or the like, to include beveled, blended, or radial insert edges 36 configured or selected to ensure a uniform expected electroformed metallic layer 130 across all surfaces 20, 22 of the fluid conduit assembly 111, component 14, or T-joint 15.

Figure 5:
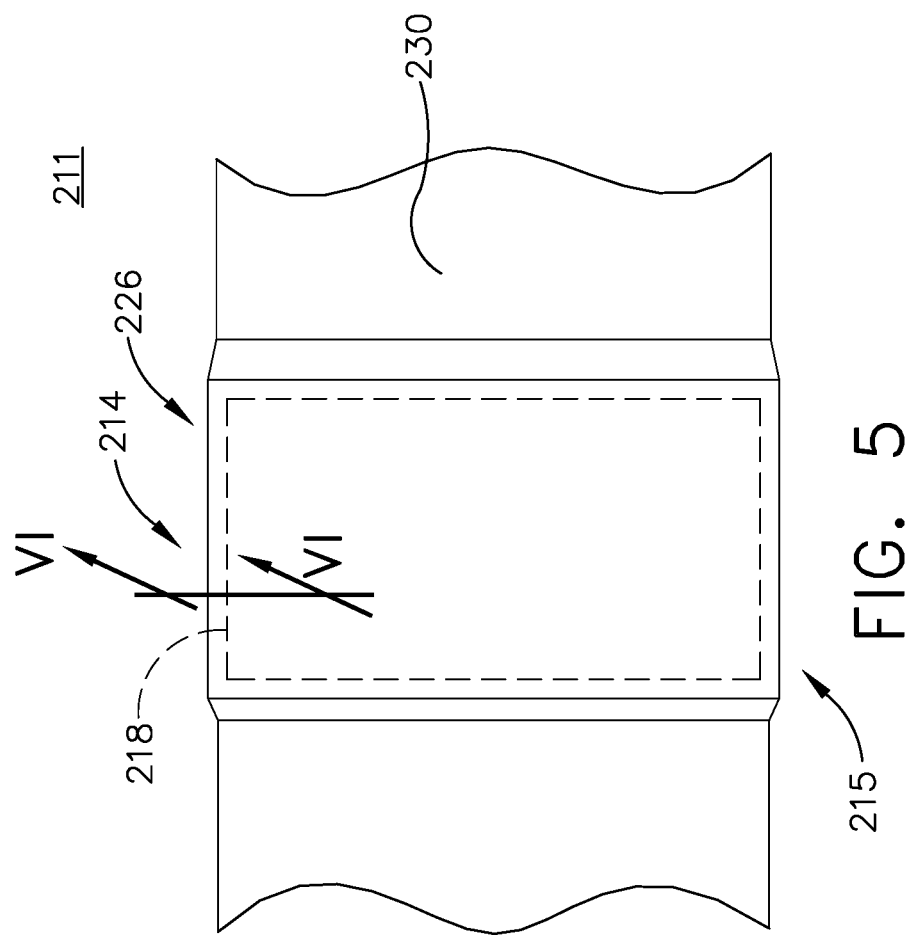
FIG. 5 is a perspective view of another strengthened component in the form of a straight pipe, with dotted schematic outline of the strengthening insert, in accordance with various aspects described herein.

FIG. 5 illustrates another fluid conduit assembly 211 according to another aspect of the present disclosure. The fluid conduit assembly 210 is similar to the fluid conduit assembly 111; therefore, like parts will be identified with like numerals increased by 200, with it being understood that the description of the like parts of the partially-formed fluid conduit assembly 111 applies to the fluid conduit assembly 211, unless otherwise noted. One difference is that the fluid conduit assembly 211 includes a component 214 in the form of a straight pipe wall 215. As schematically illustrated in dotted outline beneath the electroformed metallic layer 230, the strengthening insert 218 can comprise at least a partial ring or cylinder, or at least a partial ring or cylinder.

Figure 6:
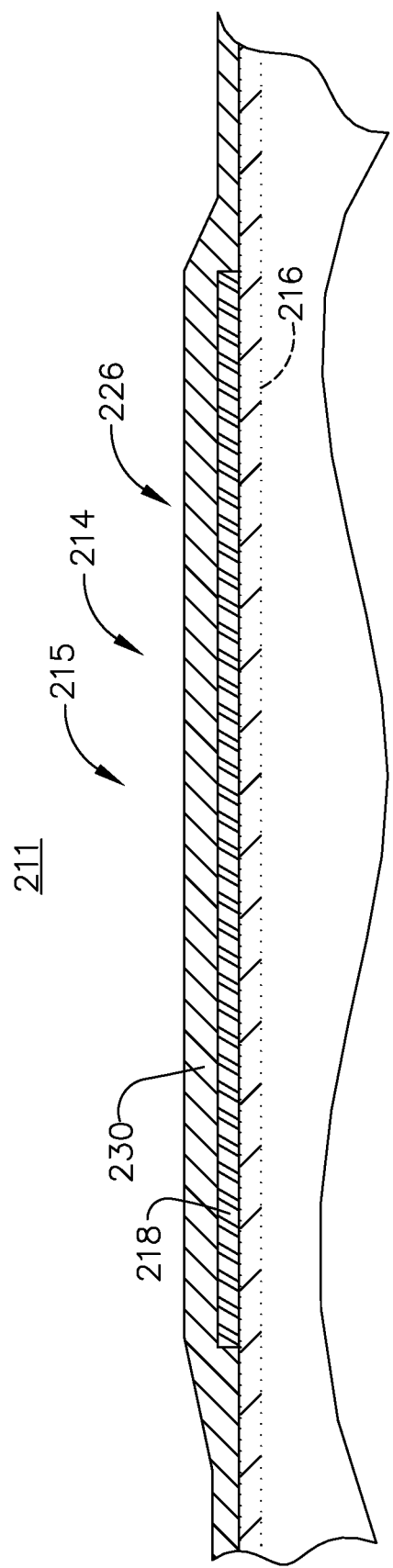
FIG. 6 is a schematic cross-sectional view of the strengthened component, taken along line VI-VI of FIG. 5, in accordance with various aspects described herein.

FIG. 6 illustrates a schematic cross section of the high stress area 26 of FIG. 5, included a dotted outline of the sacrificial material 216, for understanding. It will be understood that such sacrificial material 216 is removed prior to use of the component 214 having the strengthening insert 218.

Figure 7:
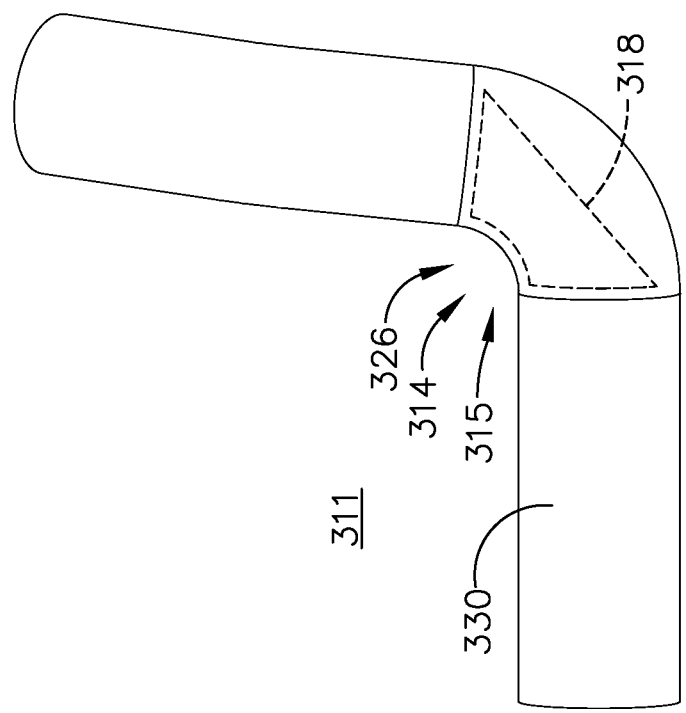
FIG. 7 is a perspective view of another strengthened component in the form of an elbow, with dotted schematic outline of the strengthening insert, in accordance with various aspects described herein.

FIG. 7 illustrates another fluid conduit assembly 311 according to another aspect of the present disclosure. The fluid conduit assembly 311 is similar to the fluid conduit assembly 111, 211; therefore, like parts will be identified with like numerals increased by 300, with it being understood that the description of the like parts of the partially-formed fluid conduit assembly 111, 211 applies to the fluid conduit assembly 311, unless otherwise noted. One difference is that the fluid conduit assembly 311 includes a component 314 in the form of an elbow 315 or elbow joint. As schematically illustrated in dotted outline beneath the electroformed metallic layer 330, the strengthening insert 318 can be positioned or configured to prevent extending or buckling of the joint 314.

Figure 8:
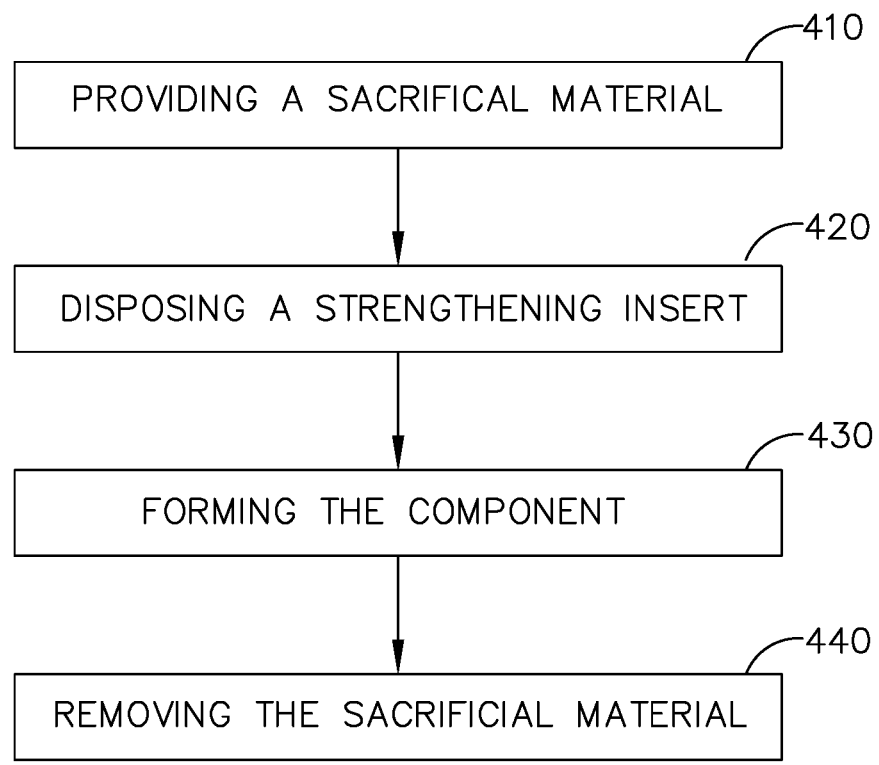
FIG. 8 is an example a flow chart diagram of demonstrating a method of for cooling a heat-generating module in accordance with various aspects described herein.

FIG. 8 illustrates a flow chart demonstrating a method 400 of forming a strengthened component 214, 314 or assembly 111, 211, 311. The method 400 begins by forming or providing a sacrificial material 16, 216, 316 into a mold of the component 14, 214, 314 having an outer surface 20 at 410. Next, the method 400 continues by disposing a strengthening insert 18, 218, 318 having an inner surface 24 and an outer surface 22 opposite and spaced from the inner surface 24 such that the strengthening insert 18, 218, 318 inner surface 24 abuts the outer surface 20 of the sacrificial material 16, 216, 316, at 420. The method 400 then proceeds to forming the component 214, 314 by way of electrodisposition of a metallic layer 130, 230, 330 over the exposed sacrificial material 16, 216, 316 outer surface 20 and the exposed strengthening insert 18, 218, 318 outer surface 22, at 430. Finally, the method 400 includes removing the sacrificial material 16, 216, 316 from the component 214, 314, as described herein, at 440.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method. For example, the method 400 can optionally include identifying a high stress area 26, 226, 326 prior to the disposing of the strengthening insert or disposing a strengthening insert having at least one of a beveled, blended, or radial insert edges. In another non-limiting example, the method 400 can include forming the component or conduit by way of a set or series of metallic layers. In yet another non-limiting example of the method 400 can include metalizing the exposed sacrificial material, the strengthening insert, or a combination thereof prior to the electrodisposition process.

Many other possible embodiments and configurations in addition to that shown in the above figures are contemplated by the present disclosure. For example, non-limiting aspects of the strengthened component, such as the strengthened joint or strengthened walls, can be implemented in any wall, or electrodisposited component to reduce the total weight of the component without compromising the structural strength. Aspects of the disclosure provide a method and apparatus forming a strengthened component, conduit, or joint. One advantage that can be realized is that the above described aspects have superior structural strength at critical joints or junctures, while reducing the total amount of electrodisposited materials or mass at non-critical areas of the element. A reduction in the total amount of electrodisposited materials or mass reduces the mass of the overall structure without compromising the integrity of the electrodisposited component. Another advantage over comparable elements or methods is that the above described aspects do not require brazing, welding, or doubling plates to reinforce or support the electroformed element, further reducing weight.

Yet another advantage of the above described aspects is by utilizing the electrodisposited processes described, a minimal thickness of the metallic layer for component integrity is predictable during forming, further ensuring or exceeding conduit integrity without adding unnecessary mass or bulk. Non-limiting aspects of the above described features can be utilized to reduce weight by an electrodisposited component by ten to fifteen percent. When designing aircraft components, important factors to address are size, weight, and reliability. The above described electrodisposited fluid conduit with strengthening insert results in a lower weight, smaller sized, increased performance, and increased integrity system. Reduced weight and size correlate to competitive advantages during flight.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a strengthened fluid conduit, the method comprising:
    providing a sacrificial material into a mold of the fluid conduit, the sacrificial material having an outer surface;
    disposing a strengthening insert having an inner surface and an outer surface, opposite and spaced from the inner surface, such that the strengthening insert inner surface abuts the mold outer surface;
    forming the fluid conduit by way of electrodeposition a metallic layer over the exposed mold outer surface and the exposed strengthening insert outer surface, defining the strengthened fluid conduit fixed to the strengthening insert; and
    removing the sacrificial material;
    wherein the metallic layer entirely covers and is fixed to the exposed strengthening insert outer surface; and
    wherein at least a portion of the inner surface of the strengthening insert abuts at least a portion of the outer surface of the sacrificial material, such that the inner surface of the strengthening insert is flush with an inner surface of the electrodeposited metallic layer of the fluid conduit.

2. The method of claim 1, further comprising identifying a high stress area of the fluid conduit prior to disposing the strengthening insert.

3. The method of claim 2 wherein identifying the high stress area includes identifying at least a portion of the fluid conduit to experience higher stress compared with non-high stress portions of the fluid conduit.

4. The method of claim 3 wherein disposing the strengthening insert includes disposing the strengthening insert relative to the mold at a high stress area of the fluid conduit.

5. The method of claim 4 wherein the fluid conduit is better suited to resist failure due to at least one of vibration, stress, or thermal cycling as compared to a fluid conduit without the strengthening insert.

6. The method of claim 1 wherein the strengthening insert is a metallic strengthening insert.

7. The method of claim 1 wherein the providing includes forming the sacrificial material into a mold of the fluid conduit includes forming the sacrificial material into a mold of at least one of a T-joint or an elbow.

8. The method of claim 1 wherein at least one of the disposing the strengthening insert or the forming the fluid conduit fixes the strengthening insert relative to the fluid conduit.

9. The method of claim 1 wherein the strengthening insert includes at least one of beveled, blended, or radial insert edges.

10. The method of claim 1 wherein the electrodeposition of the metallic layer includes forming a layer having a first thickness, less than a second thickness of the strengthening insert.

11. The method of claim 1 wherein removing the sacrificial material includes at least one of melting or dissolving the sacrificial material.

12. The method of claim 1 wherein the electrodeposition of the metallic layer includes electroforming the metallic layer at least 0.40 millimeters thick over the exposed mold outer surface and the exposed strengthening insert outer surface.

13. The method of claim 1, further comprising metalizing at least one of the exposed outer surface of the strengthening insert or the exposed mold outer surface before electrodeposition.

14. A method of forming a fluid conduit for an aircraft bleed air system, the method comprising:
  providing a sacrificial material into a mold of the fluid conduit having an outer surface;
  disposing a strengthening metallic insert relative to the mold at a high stress area pre-identified to experience higher stress during aircraft operations, compared with non-high-stress areas, the strengthening metallic insert having an inner surface and an outer surface opposite and spaced from the inner surface, the distance between the inner surface and the outer surface defining a first thickness, and wherein the strengthening metallic insert inner surface abuts the mold outer surface;
  forming the fluid conduit by way of electroforming a metallic layer over the exposed mold outer surface and the exposed strengthening metallic insert outer surface and defining an electroforming inner surface abutting the exposed mold outer surface such that the inner surface of the strengthening metallic insert is flush with the electroforming inner surface, the electroformed metallic layer having a second thickness; and
  removing the sacrificial material from the fluid conduit to define the strengthened fluid conduit that includes the strengthening metallic insert;
  wherein the metallic layer covers the entire outer surface of the strengthening insert;
  wherein the second thickness is less than the first thickness.

15. The method of claim 14, further comprising identifying a high stress area of the fluid conduit prior to disposing the strengthening metallic insert.

16. The method of claim 15 wherein identifying the high stress area includes identifying at least a portion of the fluid conduit to experience higher stress compared with another portion of the fluid conduit.

* * * * *